United States Patent [19]
Lawson et al.

[11] Patent Number: 5,523,371
[45] Date of Patent: *Jun. 4, 1996

[54] FUNCTIONALIZED POLYMER OF IMPROVED HYSTERESIS PROPERTIES PREPARED USING AMINO-SUBSTITUTED ARYLLITHIUM POLYMERIZATION INITIATORS

[75] Inventors: David F. Lawson, Uniontown; Thomas A. Antkowiak, Wadsworth; Mark L. Stayer, Jr., Mogadore; John R. Schreffler, Clinton, all of Ohio; Hideki Komatsu, Kodaira, Japan

[73] Assignee: Bridgestone Corporation, Tokyo, Japan

[*] Notice: The term of this patent shall not extend beyond the expiration date of Pat. No. 5,420,219.

[21] Appl. No.: 418,305

[22] Filed: Apr. 7, 1995

Related U.S. Application Data

[60] Continuation-in-part of Ser. No. 104,677, Aug. 10, 1993, Pat. No. 5,420,219, which is a division of Ser. No. 814,935, Dec. 30, 1991, Pat. No. 5,274,106.

[51] Int. Cl.$^6$ .......................... C08F 36/06; C08F 236/10
[52] U.S. Cl. .......................... 526/340; 526/173; 526/180; 526/335
[58] Field of Search .................................. 526/180, 340, 526/173, 335

[56] References Cited

U.S. PATENT DOCUMENTS

| | | | |
|---|---|---|---|
| 2,849,432 | 8/1958 | Kibler et al. | 260/94.2 |
| 3,109,871 | 11/1963 | Zalinski et al. | 260/85.1 |
| 3,177,190 | 4/1965 | Hsieh | 360/94.2 |
| 3,178,398 | 4/1965 | Strobel et al. | 260/85.1 |
| 3,240,772 | 3/1966 | Natta et al. | 260/88.7 |
| 3,290,277 | 12/1966 | Anderson et al. | 260/88.2 |
| 3,317,918 | 5/1967 | Foster | 260/83.7 |
| 3,326,881 | 6/1967 | Uraneck et al. | 260/94.6 |
| 3,331,821 | 7/1967 | Strobel | 260/83.7 |

(List continued on next page.)

FOREIGN PATENT DOCUMENTS

| | | |
|---|---|---|
| 0067111A2 | 5/1982 | European Pat. Off. . |
| 0180141A1 | 10/1985 | European Pat. Off. . |
| 0207565A1 | 6/1986 | European Pat. Off. . |
| 0264506A1 | 10/1986 | European Pat. Off. . |
| 0282437A2 | 3/1988 | European Pat. Off. . |
| 0290883A1 | 4/1988 | European Pat. Off. . |
| 0316255A2 | 10/1988 | European Pat. Off. . |
| 0451603A2 | 3/1991 | European Pat. Off. . |
| 2250774 | 11/1974 | France . |
| 138070 | 10/1979 | Germany . |
| 247455 | 3/1986 | Germany . |
| 54-65788 | 5/1979 | Japan . |
| 59-164308 | 9/1984 | Japan . |
| 2117778A | 3/1983 | United Kingdom . |

OTHER PUBLICATIONS

"β–Lithioenamines. New Reagents for Synthesis", by L. Duhamel, J–M Poirier, *J. Am. Chem. Soc.*, 99:25, 8356–7 (1977).

"Metalations of Benzyldimethylamine and Related Amines with η-Butyllithium in Ether. Deuteration to Form Ring and Side–chain Derivatives" by Jones et al., *J. Org. Chem.* 23, 663 (Mar. 1963) pp. 663–665.

One page translation of Japanese Abstract, Japanese Patent Application 87-180892/26.

One page Derwent Abstract of Japanese Patent JP54065788.

"Specific Functionalization of Polymers by Carboxyl Groups" by Broze et al., *Makromol. Chem.* 179, pp. 1383–1386 (1978).

"Stereospectific Addition Reaction Between Butadiene and Amines" by Imai et al., *Tetrahedron Letters No. 38*, pp. 3317–3520 (1971).

"Studies of the Anionic Polymerization of Phenyl Vinyl Sulfoxide and Its Copolymer with Styrene" by Kanga et al. *Macromolecules* 23, pp. 4235–4240 (1990).

"Synthesis of New Monomers by Addition Reactions of Diethylamine to 1,4–Divinylbenzene Catalyzed by Lithium Diethylamide" by Tsuruta et al., *Makromol. Chem.* 177, pp. 3255–3263 (1976).

"The Microstructure of Butadiene and Styrene Copolymers Sythesized with η-BuLi/THF/t-AmOK" by Lehong et al., *Journal of Applied Polymer Science*, vol. 44, pp. 1507–1511 (1992).

"Thermal Elimination of Poly(phenyl vinyl sulfoxide) and Its Polystyrene Block Copolymers" by Kanga et al., *Macromolecules* 23, pp. 4241–4246 (1990).

(List continued on next page.)

*Primary Examiner*—Fred Teskin
*Attorney, Agent, or Firm*—Daniel N. Hall

[57] ABSTRACT

A vulcanizable elastomeric compound and products such as pneumatic tires and the like, are formed from a functionalized polymer having a functional group derived from an anionic polymerization initiator. The anionic polymerization initiator comprises the general formula

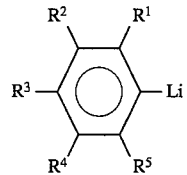

where $R^1$–$R^5$ are the same or different and are selected from the group consisting of hydrogen; alkyls having from alkyls having from 1 to about 12 carbon atoms; aralkyls having from 7 to about 20 carbon atoms; dialkylaminos having from 2 to about 20 carbon atoms; and, dialkylaminoalkyls having from 3 to about 20 carbon atoms. At least one of $R^1$–$R^5$ is selected from the group consisting of the dialkylaminos and the dialkylaminoalkyls. Methods of the present invention include preparing functionalized polymers and reducing the hysteresis of vulcanizable elastomeric compounds.

5 Claims, No Drawings

U.S. PATENT DOCUMENTS

| | | | |
|---|---|---|---|
| 3,393,182 | 7/1968 | Trepka | 260/79.5 |
| 3,426,006 | 2/1969 | Nützel et al. | 260/83.5 |
| 3,439,049 | 4/1969 | Trepka | 260/624 |
| 3,652,456 | 3/1972 | Naylor | 252/431 |
| 3,856,877 | 12/1974 | Otsuki et al. | 260/677 R |
| 3,935,177 | 1/1976 | Muller et al. | 260/84.7 |
| 4,015,061 | 3/1977 | Schulz et al. | 526/178 |
| 4,026,865 | 5/1977 | Uraneck et al. | 260/42.32 |
| 4,085,265 | 4/1978 | Otsuki et al. | 526/49 |
| 4,247,418 | 1/1981 | Halasa et al. | 252/431 N |
| 4,316,001 | 2/1982 | Boileau et al. | 528/14 |
| 4,383,085 | 5/1983 | Fujimaki et al. | |
| 4,414,372 | 11/1983 | Farnham et al. | 526/190 |
| 4,429,091 | 1/1984 | Hall | 526/181 |
| 4,476,240 | 10/1984 | Hall et al. | 502/155 |
| 4,478,953 | 10/1984 | Yuki et al. | 502/155 |
| 4,515,922 | 5/1985 | Sakakibara et al. | 525/99 |
| 4,614,771 | 9/1986 | Watanabe et al. | 525/351 |
| 4,616,069 | 10/1986 | Watanabe et al. | 525/370 |
| 4,647,634 | 3/1987 | Jalics | 526/174 |
| 4,677,153 | 6/1987 | Kitahara et al. | 524/552 |
| 4,734,461 | 3/1988 | Roggero et al. | 525/293 |
| 4,735,994 | 4/1988 | Rogger et al. | 525/279 |
| 4,736,003 | 4/1988 | Schneider et al. | 526/190 |
| 4,791,174 | 12/1988 | Bronstert et al. | 525/274 |
| 4,816,520 | 3/1989 | Bronstert | 525/285 |
| 4,835,209 | 5/1989 | Kitagawa et al. | 524/507 |
| 4,843,120 | 6/1989 | Halasa et al. | 525/53 |
| 4,894,409 | 1/1990 | Shimada et al. | 524/492 |
| 4,914,147 | 4/1990 | Mouri et al. | 524/495 |
| 4,931,376 | 6/1990 | Ikematsu et al. | 526/164 |
| 4,935,471 | 6/1990 | Halasa et al. | 525/359.1 |
| 4,978,754 | 12/1990 | Ibi et al. | 544/176 |
| 5,066,729 | 11/1991 | Stayer, Jr. et al. | 525/315 |
| 5,112,929 | 5/1992 | Hall | 526/181 |
| 5,115,035 | 5/1992 | Shiraki et al. | 525/314 |
| 5,149,457 | 9/1992 | Smith | 252/182.12 |
| 5,153,159 | 10/1992 | Antkowiak et al. | 502/155 |
| 5,238,893 | 8/1993 | Hergenrother et al. | 502/155 |
| 5,248,737 | 9/1993 | Sivak et al. | 525/384 |
| 5,292,790 | 3/1994 | Shimizu et al. | 524/496 |
| 5,332,810 | 7/1994 | Kitamura et al. | 540/450 |
| 5,393,721 | 2/1995 | Kitamura et al. | 502/154 |
| 5,420,219 | 5/1995 | Lawson et al. | 526/180 X |

OTHER PUBLICATIONS

"New perfectly difunctional organolithium initiators for block copolymer synthesis: Synthesis of dilithium initiators in the absence of polar additives", by Guyot et al., *Polymer*, vol. 22 (1981).

"Polymerization of Unsaturated Compounds in the Presence of Lithium Diethylamide" by Vinogradov et al., *Polymer Science U.S.S.R.*, vol. 4, pp. 1568–1572 (1963).

"Ortho Lithiation via a Carbonyl Synthon" by Harris et al., *J. Org. Chem.*, vol. 44, No. 12, pp. 2004 & 2006 (1979).

"Preparation and Reactions of Trialkyltinlithium" by Tamborski et al., pp. 237–239, Jan. 1963.

"Preparation of Some Trialkyltin–lithium Compounds" by Gilman et al., *J. Am. Chem. Soc.* 75, pp. 2507–2509 (1953).

"Some Reactions of Tributly–and Triphenyl–stannyl Derivatives of Alkali Metals" by Blake et al., *J. Chem. Soc.*, pp. 618–622 (1961).

"Anionic Polymerization Intiators Containing Protected Functional Groups. II." by Schulz et al., *Journal of Polymer Science: Polymer Chemistry Edition*, vol. 15, pp. 2401–2410 (1977).

"Bifunctional anionic intiators: A critical study and overview" by Bandermann et al., *Makromol. Chem 186*, pp. 2017–2024 (1985).

"Butadiene–Styrene Copolymerization Initiated by η–BuLi/THF/t–AmOK", by Lehong et al., *Journal of Applied Polymer Science*, vol. 44, pp. 1499–1505 (1992).

"6001 Chemical Abstracts", vol. 91, pp. 59 (1979).

"Copolymerization of Butadiene and Styrene by Initiation with Alkyllithium and Alkai Metal tert–Butoxides" by Wofford et al., *Journal of Polymer Science: Part A–1*, vol. 7, pp. 461–469 (1969).

"Lithium Amide Catalyzed Amine–Olefin Addition Reactions" by Schlott et al., *J. Org. Chem.*, vol. 37, No. 26, pp. 4243–4245 (1972).

"3–Dimethylaminopropyl–Lithium–An Analytical and Kinetic Investigation of as New Initiator System for Polymer Synthesis" by Eisenbach et al., *European Patent Journal*, vol. 11, pp. 699–704 (1975).

"A Bifunctional Anionic Initiator Soluble in Non–polar Solvents" by Beinert et al., *Makromol. Chem* 179, pp. 551–555 (1978).

"An improved synthesis of p–dimethylaminophenyl––lithium" by Hallas et al., *Chemistry and Industry*, pp. 620 (1969).

"Anionic Polymerization. VII Polymerization and Copolymerization with Lithium Nitrogen–Bonded Initiator" by Cheng, *American Chemical Society*, pp. 513–528 (1981).

"Anionic Polymerization Initiators Containing Protected Functional Groups and Functionally Terminated Diene Polymer" by Schulz et al., *Journal of Polymer Science: Polymer Chemistry Edition*, vol. 12, pp. 153–155 (1974).

"Anionic Polymerization Initiated by Diethylamide in Organic Solvent, I. The Use of Lithium Diethylamide as a Polymerization Catalyst and the Effect of Solvent Type on the Polymerization of Isoprene and Styrene" by Angood et al., *Journal of Polymer Science: Polymer Chemistry Edition*, vol. 11, pp. 2777–2791 (1973).

FUNCTIONALIZED POLYMER OF IMPROVED HYSTERESIS PROPERTIES PREPARED USING AMINO-SUBSTITUTED ARYLLITHIUM POLYMERIZATION INITIATORS

RELATED APPLICATION

This Application is a Continuation-In-Part of U.S. patent application Ser. No. 08/104,677, which has now been issued as U.S. Pat. No. 5,420,219 which in turn is a division of U.S. patent application Ser. No. 07/814,935 now issued as U.S. Pat. No. 5,274,106.

TECHNICAL FIELD

The subject invention relates to the anionic polymerization of diene polymer and copolymer elastomers. More specifically, the present invention relates to anionic polymerization employing an amino-substituted aryllithium initiator compound.

Diene polymers and copolymers prepared according to the present invention, have reduced hysteresis characteristics. Articles such as tires, power belts and the like which are prepared from these polymers exhibit increased rebound, decreased rolling resistance and less heat build-up during mechanical stress operations.

BACKGROUND OF THE INVENTION

In the art it is desirable to produce elastomeric compounds exhibiting reduced hysteresis. Such elastomers, when compounded to form articles such as tires, power belts and the like, will show an increase in rebound, a decreased rolling resistance and will have less heat build-up when mechanical stresses are applied.

Previous attempts at preparing reduced hysteresis products have included high temperature mixing of the filler-rubber mixtures in the presence of selectively-reactive promoters to promote compounding material reinforcement; surface oxidation of the compounding materials; chemical modifications to the terminal end of polymers using tetramethyldiaminobenzophenone (Michler's ketone), tin coupling agents, aminoaldehydes, tetrachlorofulvenes, various amides and ureas, certain cyclic amides and lactams, dimethylimidazolidinone, carbodiimide, pyridine and the like; and, surface grafting thereon. All of these approaches have focused upon increased interaction between the elastomer and the compounding materials.

It has also been recognized that carbon black, employed as a reinforcing filler in rubber compounds, should be well dispersed throughout the rubber in order to improve various physical properties. One example of the recognition is provided in published European Pat. Appln. EP 0 316 255 A2 which discloses a process for end capping polydienes by reacting a metal terminated polydiene with a capping agent such as a halogenated nitrile, a heterocyclic aromatic nitrogen containing compound or an alkyl benzoate. Additionally, that application discloses that both ends of the polydiene chains can be capped with polar groups by utilizing functionalized initiators, such as lithium amides.

The present invention provides novel initiators for anionic polymerization which become incorporated into the polymer chain providing a functional group which greatly improves the dispersability of carbon black throughout the elastomeric composition during compounding. As will be described hereinbelow, these initiators are compounds containing an amino-substituted aryl group.

Organolithium polymerization initiators are also known in the art. U.S. Pat. No. 3,439,049, owned by the Assignee of record, discloses an organolithium initiator prepared from a halophenol in a hydrocarbon medium.

U.S. Pat. No. 4,015,061 is directed toward amino-functional initiators which polymerize diene monomers to form mono- or di-primary aryl amine-terminated diene polymers upon acid hydrolysis.

U.S. Pat. No. 4,914,147 discloses terminal modifying agents including dialkylamino-substituted aromatic vinyl compounds such as N,N'-dimethylamino benzophenone and p-dimethylamino styrene, in rubber compositions having reduced hysteresis characteristics. In U.S. Pat. No. 4,894,409, an amino group-containing monomer, such as 2-N,N-dimethylaminostyrene is polymerized to form an amino group-containing diene based polymer.

Thus, the foregoing art has not employed an amino-substituted aryllithium initiator compound for the incorporation of an amino-substituted aryl functional group at one end of the chain, with a lithium atom at the opposite end prior to quenching.

SUMMARY OF INVENTION

It is therefore an object of the present invention to provide anionic polymerization initiators which promote the incorporation of functional, active groups in the polymer chain.

It is another object of the present invention to provide a method of preparing an anionic polymerization initiator.

It is another object of the present invention to provide functionalized polymers having active terminal groups.

It is another object of the present invention to provide a method for preparing functionalized polymers having active terminal groups.

It is still another object of the present invention to provide a method for the preparation of a functionalized polymer.

It is yet another object of the present invention to provide a method for reducing the hysteresis of elastomeric vulcanizable compounds.

It is another object of the present invention to provide vulcanizable elastomeric compounds having reduced hysteresis.

It is still another object of the present invention to provide an improved pneumatic tire having decreased rolling resistance.

These and other objects together with the advantages thereof over the existing art, which shall become apparent from the specification which follows, are accomplished by the invention as hereinafter described and claimed.

In general the present invention provides an anionic polymerization initiator which comprises the general formula

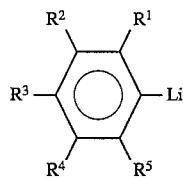

where $R^1$–$R^5$ are the same or different and are selected from the group consisting of hydrogen; alkyls having from 1 to about 12 carbon atoms; aralkyls having from 7 to about 20 carbon atoms; dialkylaminos having from 2 to about 20 carbon atoms; and, dialkylaminoalkyls having from 3 to about 20 carbon atoms. At least one of $R^1$–$R^5$ is selected from the group consisting of the dialkylaminos and the dialkylaminoalkyls.

There is also provided according to the invention, a functionalized polymer which comprises a polymer chain carrying a functional group at one end of the chain and a lithium atom at the other end of the chain prior to quenching. The functional group has the general formula

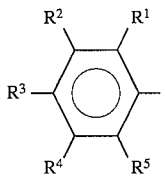

where $R^1$–$R^5$ are the same or different and are selected from the group consisting of hydrogen; alkyls having from 1 to about 12 carbon atoms; aralkyls having from 7 to about 20 carbon atoms; dialkylaminos having from 2 to about 20 carbon atoms; and, dialkylaminoalkyls having from 3 to about 20 carbon atoms. At least one of $R^1$–$R^5$ is selected from the group consisting of the dialkylaminos and the dialkylaminoalkyls.

There is also provided according to the invention, a functionalized polymer of the type formed by the polymerization of at least one anionically polymerizable monomer, and improved with respect to its hysteresis properties. The improvement comprises polymerizing the monomer in the presence of a polymerization initiator having the general formula

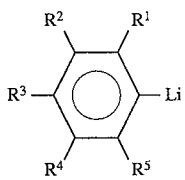

where $R^1$–$R^5$ are the same or different and are selected from the group consisting of hydrogen; alkyls having from 1 to about 12 carbon atoms; aralkyls having from 7 to about 20 carbon atoms; dialkylaminos having from 2 to about 20 carbon atoms; and, dialkylaminoalkyls having from 3 to about 20 carbon atoms. At least one of $R^1$–$R^5$ is selected from the group consisting of the dialkylaminos and the dialkylaminoalkyls.

Further still according to the invention, a vulcanizable elastomeric compound having reduced hysteresis properties, comprises an elastomeric polymer having a plurality of chains. Substantially each chain carries a functional group at the initiator end of the chain and a lithium atom at the other end of the chain, prior to quenching. The functional group has the general formula

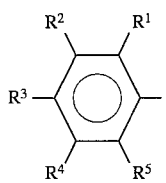

where $R^1$–$R^5$ are the same or different and are selected from the group consisting of hydrogen; alkyls having from 1 to about 12 carbon atoms; aralkyls having from 7 to about 20 carbon atoms; dialkylaminos having from 2 to about 20 carbon atoms; and, dialkylaminoalkyls having from 3 to about 20 carbon atoms. At least one of $R^1$–$R^5$ is selected from the group consisting of the dialkylaminos and the dialkylaminoalkyls.

An improved tire according to the invention has decreased rolling resistance, and results from a treadstock containing a vulcanizable elastomeric composition which comprises an elastomeric polymer having a plurality of chains. Substantially each chain carries a functional group at the initiator end of the chain and a lithium atom at the other end of the chain prior to quenching. The functional group has the general formula

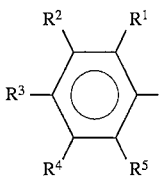

where $R^1$–$R^5$ are the same or different and are selected from the group consisting of hydrogen; alkyls having from 1 to about 12 carbon atoms; aralkyls having from 7 to about 20 carbon atoms; dialkylaminos having from 2 to about 20 carbon atoms; and, dialkylaminoalkyls having from 3 to about 20 carbon atoms. At least one of $R^1$–$R^5$ is selected from the group consisting of the dialkylaminos and the dialkylaminoalkyls.

The present invention also provides a method of preparing a functionalized polymer comprising the steps of forming a solution of one or more anionically polymerizable monomers in a solvent; and, polymerizing the monomers in the presence of a polymerization initiator having the general formula

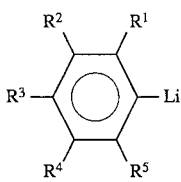

where $R^1$–$R^5$ are the same or different and are selected from the group consisting of hydrogen; alkyls having from 1 to about 12 carbon atoms; aralkyls having from 7 to about 20 carbon atoms; dialkylaminos having from 2 to about 20 carbon atoms; and, dialkylaminoalkyls having from 3 to about 20 carbon atoms; and where at least one of $R^1$–$R^5$ is selected from the group consisting of the dialkylaminos and the dialkylaminoalkyls.

Finally, a method for reducing the hysteresis of vulcanizable elastomeric compounds is provided which comprises the steps of polymerizing one or more anionically polymerizable monomers in the presence of an initiator having the general formula

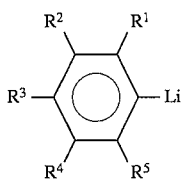

where $R^1$–$R^5$ are the same or different and are selected from the group consisting of hydrogen; alkyls having from 1 to about 12 carbon atoms; aralkyls having from 7 to about 20 carbon atoms; dialkylaminos having from 2 to about 20 carbon atoms; and, dialkylaminoalkyls having from 3 to about 20 carbon atoms; and where at least one of $R^1$–$R^5$ is selected from the group consisting of the dialkylaminos and the dialkylaminoalkyls; quenching the polymerization to form an elastomer; and adding from about 5 to 80 parts by weight of carbon black, per 100 parts of the elastomer to form a blend of the vulcanizable elastomeric composition.

A functionalized polymer according to the invention comprises a polymer chain selected from the group consisting of diene homopolymers and copolymers with monovinyl aromatic polymers, and carrying a functional group at one end of the chain and a lithium atom at the other end of the chain prior to quenching, and having the general formula $R^6$-polymer-Li wherein $R^6$ is a functional group having a structure selected from the group consisting of

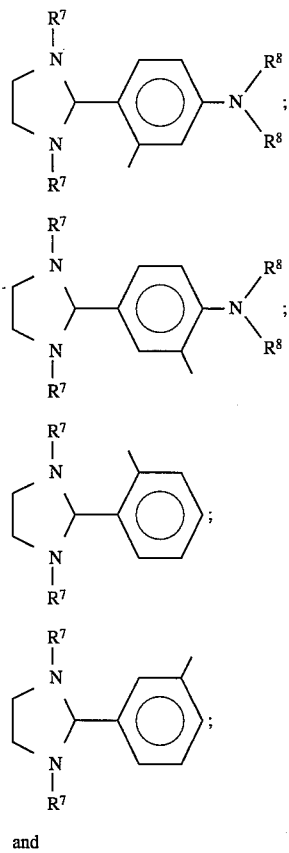

and

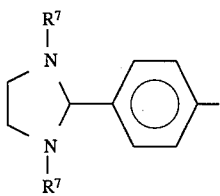

wherein each $R^7$ is the same or different and is an alkyl group having from 1 to about 8 carbon atoms, and wherein each $R^8$ is the same or different and is an alkyl group having from 1 to about 8 carbon atoms.

The invention also provides a functionalized polymer of the type formed by the polymerization of at least one anionically polymerizable monomer, and improved with respect to its hysteresis properties. The improvement comprises polymerizing at least one monomer selected from diolefin monomers having from about 4 to about 12 carbon atoms, monovinyl aromatic monomers having from about 8 to about 20 carbon atoms, and trienes in the presence of a polymerization initiator having a structure selected from the group consisting of

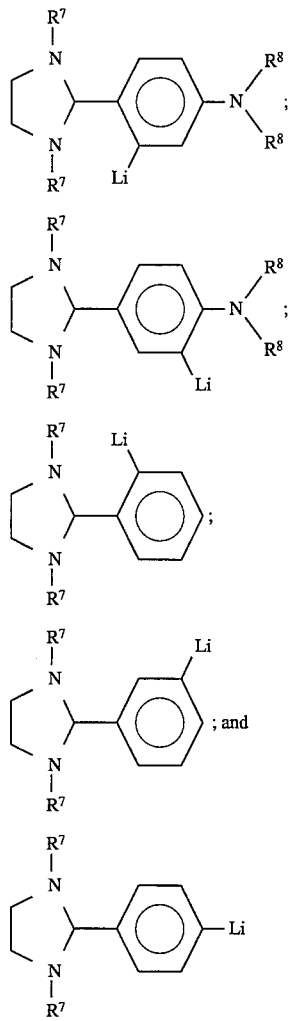

wherein $R^7$ and $R^8$ are as described hereinabove.

PREFERRED MODE FOR CARRYING OUT THE INVENTION

As will become apparent from the description which follows, the present invention provides a novel initiator for anionic polymerization of diene homopolymer and copolymer elastomers. Polymers prepared with these initiators contain a functional terminal group, and it has been discovered herein that vulcanizable elastomeric compounds and articles thereof based upon such functionally terminated polymers exhibit useful properties, particularly, reduced hysteresis. When compounded to make products such as tires, power belts and the like, these polymeric products exhibit increased rebound, decreased rolling resistance and less heat build-up during periods of applied mechanical stress.

The initiators according to the present invention are amino-substituted aryllithium compounds. More particularly, the initiators according to the present invention have the following general formula

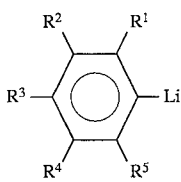

The groups $R^1$, $R^2$, $R^3$, $R^4$ and $R^5$ (collectively referred to herein as "$R^1$–$R^5$") may be the same or different. Each of the groups $R^1$–$R^5$ may be a hydrogen; an alkyl having from 1 to about 12 carbon atoms; an aralkyl having from 7 to about 20 carbon atoms; a dialkylamino having from 2 to about 20 carbon atoms; or a dialkylaminoalkyl having from 3 to about 20 carbon atoms. At least one of the groups $R^1$–$R^5$ is either one of the dialkylaminos or the dialkylaminoalkyls. Among the dialkyl amino groups that are useful as $R^1$–$R^5$ are those of the formula

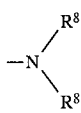

wherein each $R^8$ is independently methyl, ethyl, propyl, isopropyl, etc. Among the dialkyl amino alkyls are N,N'-dialkyldiaminoalkylenealkyl groups that are derived from N,N"-di(alkyl)alkylenediamines through condensation with aldehyde groups. The condensation product is often referred to as an aminal, being the reaction product of an amine and an aldehyde. It is, in general, a bis(N,N-dialkylamino)alkyl group. Typical alkylene diamines are ethylene-, 1,2-propylene- and 1,3-propylene-diamines which have 5- or 6-member ring diamine structures such as

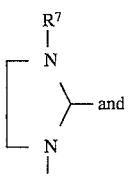

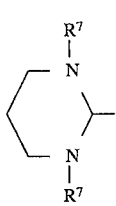

where each $R^7$ is methyl, ethyl, propyl, isopropyl, etc. When the two nitrogens of the dialkylaminoalkyls are tied together through an alkylene group to form a ring, the structure may be referred to as a 2-(N,N'-dialkyl-diazaalkylene) group, as a 2(1,3-dialkyl-1,3-diazacycloalkane) or as a 2-(N,N'-dialkyl-1,3-diazacycloalkane) group. These specific ring structures can also be named according to heterocyclic nomenclatures: the five-membered ring structure is a 2-(1,3-dialkylimidazolidine) or 2-N,N'-dialkylimidazolidine, the six-membered ring is a 2-(N,N'-dialkyl tetrahydropyrimidine), the seven-membered ring is a 2-(N,N'-dialkyl perhydrodiazepine), etc.

The initiators according to the present invention are for example, the products of ring-metalation of amino aryl compounds; or metal-halogen exchange reactions with aminoaryl halides; or, the reduction of aminoarylhalides with lithium. One preferred initiator is formed by the reaction of n-butyl lithium or sec-butyl lithium, with the reaction product of N',N"-dimethylethylenediamine and 4-(N,N-diethylamino) benzaldehyde. This initiator compound, hereinafter designated as "structure I" has the formula

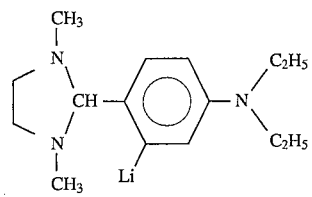

Structure I wherein the genera formula $R^1$, $R^3$ and $R^4$ are hydrogen, $R^2$ is diethylamino and $R^5$ is 2-N,N'-dimethylimidazolidino.

Another preferred initiator is a tetramethyl-p-phenylene diamine, hereinafter designated as "structure II", and which has the formula

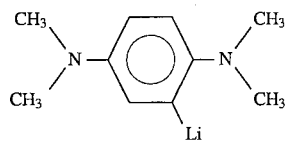

Structure II in which $R^1$ and $R^4$ of the general formula are each

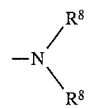

$R^8$ in each case being methyl.

Still another preferred initiator is the metal-halogen exchange product of the cyclic aminal of N,N'-dimethyl ethylenediamine and 4-bromobenzaldehyde, hereinafter designated as "structure III" and which has the formula

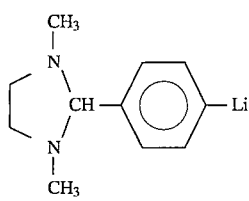

Structure III in which $R^3$ of the general formula is a dialkyldiaminoalkyl, that is a N,N'-dialkyldiaminoalkylenealkyl group, wherein each alkyl $R^7$ is methyl and the alkylene is ethylene.

Other suitable initiators may be formed for example, by the reduction of other aminoaryl bromides with lithium metal, or by exchange with alkyllithium compounds.

Still other preferred initiators are the ring lithiation products obtained by treatment of the product of the cyclic aminal of N,N'-dialkylethylenediamine and benzaldehyde or a dialkylamino benzaldehyde, with an organolithium reagent in the presence of a metalation promoter such as an amine or ether. Examples of such initiators formed by the reaction with a dialkylamino benzaldehyde have the following general formulas:

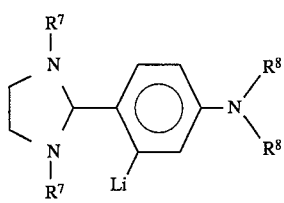

Structure IVa and

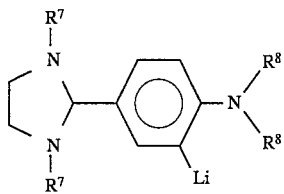

Structure IVb in which $R^1$ of the general formula is a N,N'-dialkyldiaminoalkylenealkyl group and $R^4$ of the general formula is a dialkyl amino group. Examples of such initiators formed by the reaction with a benzaldehyde have the following general formulas:

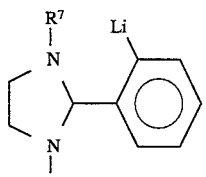

Structure IVc

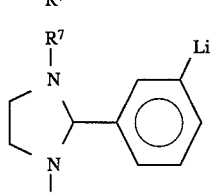

Structure IVd and

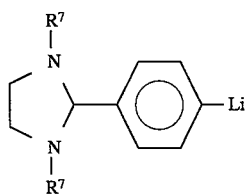

Structure IVe

In the above general formulas, each $R^7$ is the same or different and is an alkyl group having from 1 to about 8 carbon atoms, and each $R^8$ is the same or different and is an alkyl group having from 1 to about 8 carbon atoms. When each $R^7$ is a methyl group in Structure IVe, the structure is the same as Structure III hereinabove. Similarly, when each $R^7$ is a methyl group and each $R^8$ is an ethyl group in Structure IVa, the structure is the same as Structure I hereinabove.

The initiator thus prepared, is employed to prepare any anionically-polymerized elastomer, e.g., polybutadiene, polyisoprene and the like, and copolymers thereof with monovinyl aromatics such as styrene, alpha methyl styrene and the like, or trienes such as myrcene. Thus, the elastomers include diene homopolymers, A, and copolymers thereof with monovinyl aromatic polymers, B. Exemplary diene homopolymers are those prepared from diolefin monomers having from 4 to about 12 carbon atoms. Exemplary vinyl aromatic polymers are those prepared from monomers having from 8 to about 20 carbon atoms. Preferred elastomers include diene homopolymers such as polybutadiene and polyisoprene and copolymers such as styrene butadiene rubber (SBR). Copolymers can comprise from about 99 to 20 percent by weight of diene units and from about 1 to about 80 percent by weight of monovinyl aromatic or triene units, totalling 100 percent. The polymers and copolymers of the present invention may have 1,2-microstructure contents ranging from about 10 to about 80 percent, with the preferred polymers or copolymers having 1,2-microstructure contents of from about 25 to 65 percent, based upon the diene content. The molecular weight of the polymer that is produced according to the present invention, is preferably such that a proton-quenched sample will exhibit a gum Mooney viscosity (ML/4/22) of from about 10 to about 150.

The copolymers are preferably random copolymers which result from simultaneous copolymerization of the monomers forming the A and B polymer blocks, as is known in the art. The block copolymers (poly (b-B-b-A-b-B)), result from the separate polymerization of the monomers forming the A and B polymer blocks as is known in the art. Such block copolymers which include poly(styrene-butadiene-styrene) are thermoplastic elastomers.

The initiators of the present invention form "living polymers" from the foregoing monomers, the general formula prior to quenching of which is

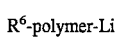

where the polymer is any of the foregoing diene homopolymers, monovinyl aromatic homopolymers, diene/monovinyl aromatic random copolymers and block copolymers and $R^6$ is a functional group derived from the initiator. $R^6$ is preferably

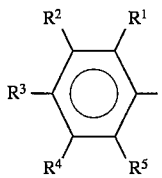

where $R^1$–$R^5$ are as defined hereinabove. The lithium proceeds to move down the growing chain as polymerization continues, until the reaction is quenched.

Polymerization is usually conducted in a conventional solvent for anionic polymerizations such as hexane, cyclohexane, benzene and the like. Other techniques for polymerization, such as semi-batch and continuous polymerization may be employed. In order to promote randomization in copolymerization and to increase vinyl content, a modifier may optionally be added to the polymerization ingredients. Amounts range between 0 to 90 or more equivalents per equivalent of lithium. The amount depends upon the amount of vinyl desired, the level of styrene employed and the temperature of the polymerizations, as well as the selected modifier.

Compounds useful as modifiers are organic and include those having an oxygen or nitrogen hetero-atom and a non-bonded pair of electrons. Examples include dialkyl ethers of mono and oligo alkylene glycols; "crown" ethers; tertiary amines such as tetramethylethylene diamine (TMEDA); THF; THF oligomers; linear and cyclic oligomeric oxolanyl alkanes, and the like. Details of linear oligomeric oxolanyl modifiers can be found in U.S. Pat. No. 4,429,091, owned by the Assignee of record, the subject matter of which is incorporated herein by reference.

Polymerization is usually begun by charging a blend of the monomer(s) and solvent to a suitable reaction vessel, followed by the addition of the modifier and the initiator solution previously described. Alternatively, the monomer and modifier can be added to the initiator. The procedure is carried out under anhydrous, anaerobic conditions. The reactants are heated to a temperature of from about 30° to 120° C. and are agitated for about 0.15 to 24 hours. After polymerization is complete, the product is removed from the heat and terminated in one or more ways.

For example, a protic quenching agent may be employed to give a monofunctional polymer chain. Quenching may be conducted in water, steam or an alcohol such as isopropanol, or any other suitable method. Quenching may also be conducted with a functional terminating agent, resulting in a difunctional polymer. For example, useful functional terminating agents include alkenyl aromatic vinyl compounds, halogenated tin compounds such as tributyl tin chloride and tin tetrachloride, halogenated silicon compounds, isocyanate compounds, dialkylamino-substituted aromatic vinyl compounds, nitrogen-containing aromatic hetero compounds, cyclic urea, and other reactive hysteresis-reducing terminating compounds which may contain other heteroatoms such as oxygen, nitrogen, sulfur, phosphorus, non-interfering halogen, or the like. Other terminators include isomeric vinylpyridines, dimethylimidazolidinone, Schiff bases and the like. The living polymer may also be coupled with any of the known coupling reagents such as silicon tetrachloride, to prepare dicapped polymers.

Further examples of terminating agents include the terminators described in application Ser. No. 07/506,305, now U.S. Pat. No. 5,153,159 and U.S. Pat. No. 5,066,729, the subject matter of which is incorporated by reference herein. It is to be understood that practice of the present invention is not limited solely to these terminators inasmuch as other compounds that are reactive with the polymer bound carbon-lithium moiety can be selected to provide a desired functional group.

Quenching is usually conducted by stirring the polymer and quenching agent for about 0.05 to about 2 hours at temperatures of from about 30° to 120° C. to ensure complete reaction. Polymers terminated with a functional group as discussed hereinabove, are subsequently quenched with alcohol or other quenching agent as described hereinabove.

Lastly, the solvent is removed from the polymer by drum drying, extruder drying, vacuum drying or the like, which may be combined with coagulation with water, alcohol or steam. If coagulation with water or steam is used, oven drying may be desirable.

The polymers of the present invention contain a functional group at the head of the polymer chain rather than at the terminal end of the chain. These functional groups have an affinity for compounding materials such as silica and carbon black. Such compounding results in products exhibiting reduced hysteresis, which means a product having increased rebound, decreased rolling resistance and has lessened heat build-up when subjected to mechanical stress. Products including tires, power belts and the like are envisioned. Decreased rolling resistance is, of course, a useful property for pneumatic tires, both radial as well as bias ply types and thus, the vulcanizable elastomeric compositions of the present invention can be utilized to form treadstocks for such tires.

The polymers of the present invention can be utilized as 100 parts of the rubber in the treadstock compound or, they can be blended with any conventionally employed treadstock rubber which includes natural rubber, synthetic rubber and blends thereof. When the polymers of the present invention are blended with conventional rubbers, the amounts can vary widely with a lower limit comprising about 10 to 20 percent by weight of the total rubber. It is to be appreciated that the minimum amount will depend primarily upon the degree of reduced hysteresis that is desired.

The polymers can be compounded with all forms of carbon black in amounts ranging from about 5 to 80 parts by weight, per 100 parts of rubber (phr), with about 35 to 60 phr being preferred. The carbon blacks may include any of the commonly available, commercially-produced carbon blacks but those having a surface area (EMSA) of at least 20 $m^2$/gram and more preferably at least 35 $m^2$/gram up to 200 $m^2$/gram or higher are preferred. Surface area values used in this application are those determined by ASTM test D-1765 using the cetyltrimethyl-ammonium bromide (CTAB) technique. Among the useful carbon blacks are furnace black, channel blacks and lamp blacks. More specifically, examples of the carbon blacks include super abrasion furnace (SAF) blacks, high abrasion furnace (HAF) blacks, fast extrusion furnace (FEF) blacks, fine furnace (FF) blacks, intermediate super abrasion furnace (ISAF) blacks, semi-reinforcing furnace (SRF) blacks, medium processing channel blacks, hard processing channel blacks and conducting channel blacks. Other carbon blacks which may be utilized include acetylene blacks. Mixtures of two or more of the above blacks can be used in preparing the carbon black products of the invention. Typical values for surface areas of usable carbon blacks are summarized in the TABLE I hereinbelow.

TABLE I

| Carbon Blacks | |
|---|---|
| ASTM Designation (D-1765-82a) | Surface Area ($m^2$/g) (D-3765) |
| N-110 | 126 |
| N-220 | 111 |
| N-339 | 95 |
| N-330 | 83 |
| N-351 | 74 |
| N-550 | 42 |
| N-660 | 35 |

The carbon blacks utilized in the preparation of the rubber compounds of the invention may be in pelletized form or an unpelletized flocculent mass. Preferably, for more uniform mixing, unpelletized carbon black is preferred.

The reinforced rubber compounds can be cured in a conventional manner with known vulcanizing agents at about 0.1 to 10 phr. For a general disclosure of suitable vulcanizing agents one can refer to Kirk-Othmer, *Encyclopedia of Chemical Technology*, 3rd ed., Wiley Interscience, New York 1982, Vol. 20, pp. 365–468, particularly "Vulcanization Agents and Auxiliary Materials" pp. 390–402. Vulcanizing agents can be used alone or in combination.

Vulcanizable elastomeric compositions of the invention can be prepared by compounding or mixing the functionalized polymers herein with carbon black and other conventional rubber additives including for example, fillers, such as silica, plasticizers, antioxidants, curing agents and the like using standard rubber mixing equipment and procedures. Such elastomeric compositions when vulcanized using conventional rubber vulcanization conditions have reduced hysteresis properties and are particularly adapted for use as tread rubbers for tires having reduced rolling resistance.

GENERAL EXPERIMENTAL

In order to demonstrate the preparation and properties of elastomers prepared according to the present invention, several initiators were prepared according to the disclosure made hereinabove. The initiators were used to polymerize a styrene butadiene rubber (SBR). As noted above, various techniques known in the art for carrying out polymerizations may be used with these initiators without departing from the scope of the present invention.

EXAMPLE NO. 1 Preparation of Polymer from the Initiator of Structure I

Preparation of Initiator

The cyclic aminal precursor of structure I was prepared by the condensation of equimolecular amounts of N,N'-dimethylethylene diamine with p-diethylaminobenzaldehyde, carried out in refluxing toluene with continuous azeotropic removal of water. The product distilled at 123°–125° C. at 1 Torr, and was found to be of 96+ percent purity by GC/MS. The ortho-Li derivative was prepared by treating the cyclic aminal with 1.0 equivalent of sec-butyl Li and 0.8 equivalent of tetramethylethylene diamine (TMEDA) for 16 hours at 50° C. in a hexane/cyclohexane solution. The resulting solution was approximately 0.57 molar, and was used to initiate polymerization.

Polymerization of Butadiene and Styrene

A 0.57M solution of an initiator made in the above manner was added to a 75 percent/25 percent by weight blend of butadiene and styrene in hexane, at a level of 0.8 meq Li/100 g monomer. The mixture was agitated at 50° C. for 4.5 hours, proceeding to approximately 100 percent conversion to polymer. In practice, there is considerable leeway in the reaction times and temperatures, much the same as there is leeway in the reaction vessels, type of agitation, etc., used. The treated cements then were quenched by injection with 1.5 ml of isopropyl alcohol (i-PrOH), treated with an antioxidant (2 ml of a mixture containing 2.0 weight percent DBPC/and 0.07 weight percent UOP-88 in hexane), coagulated in i-PrOH, air-dried at room temperature, then drum-dried. Suitable characterizations were performed. The product polymer contained 25.4 percent styrene (2.8 percent block), 30.4 percent vinyl (42 percent vinyl if BD=100 percent), Tg–27.1° C., GPC(THF): $\overline{M}n$ 147748, MWD 1.66, raw ML/4/100=54.

Evaluation of Compounded Properties

The product polymer was compounded and tested as indicated in the test recipe shown in Table I, and cured according to the following: 1.5"×4"×0.040" tensile plaques, 35 minutes at 300° F.; Dynastat buttons, 40 minutes at 300° F.

TABLE II

| Compound Formulation for Evaluation of Hysteresis | |
| --- | --- |
| COMPONENT | PARTS PER HUNDRED PARTS RUBBER |
| Polymer | 100 |
| Naphthenic Oil | 10 |
| Carbon Black, N-351 | 55 |
| ZnO | 3 |
| Antioxidant | 1 |
| Wax Blend | 2 |
| Total Masterbatch | 171 |
| Masterbatch mixed for 5 minutes at 145° to 155° C., 60 RPM | |
| Stearic Acid | 2 |
| Sulfur | 1.5 |
| Accelerator | 1 |
| Total Final | 175.5 |

TABLE II-continued

Final mix at 77° to 93° C., 40 RPM, for 3 minutes
Results of Physical tests were as follows:

| Example | ML/4/212 | | 1 Hz Dynastat tan δ | Ring Stress-Strain Room Temp. | | |
| --- | --- | --- | --- | --- | --- | --- |
| No. | (gum) | (cpd) | 50° C. | M300 | T.S. | % Eb |
| 1 | 54 | 83 | 0.1037 | 2251[a] | 2996[a] | 442 |

[a]psi

The results of this test provided good evidence for reduced hysteresis in this polymer. The Dynastat tan δ (50° C.)=0.1037. is about 30 percent below the value found for an unmodified polymer of this molecular weight, prepared using a typical alkyllithium initiator.

EXAMPLE NO. 2 Preparation and Evaluation of Polymer from the Initiator of Structure II Tetramethyl-p-phenylenediamine was treated with s-BuLi/TMEDA in cyclohexane in a manner similar to that described above. It initiated polymerization to give SBR with 26.1 percent styrene (0 percent block), 47.8 percent vinyl, Tg –23.6° C., Mn 150148, Mw/Mn 1.62. When tested in the standard recipe using the Dynastat, the compounded polymer had tan δ (50° C.)=0.1323, which is about 10 percent below the value expected for an unmodified polymer of this molecular weight, prepared using a typical alkyllithium initiator.

EXAMPLE NO. 3 Preparation of Polymer from the Initiator of Structure III

The cyclic aminal of p-bromobenzaldehyde was prepared in a manner similar to that for the precursor of I: A 10 mole percent excess of N,N'-dimethylethylene diamine was refluxed in the presence of p-bromobenzaldehyde in toluene for three days, with azeotropic removal of water. After removal of solvent by distillation, the residue was distilled under vacuum, to give the cyclic aminal in 96 percent yield. The structure of the product was confirmed by $^{1}$HNMR (CDCl$_{3}$); δ2.13 (s,6H), 2.49 (m, 2H); 3.21 (s, 1H); 3.40 (m, 2H); 7.42 (m, 4H) (no absorption below 7.5δ). It was readily soluble in hexane. Upon treatment of a hexane solution of this aminal with an equimolar amount of n-BuLi in hexane, a precipitate formed.

This heterogeneous initiator was used in the following manner to polymerize a mixture of butadiene and styrene: A dried, nitrogen purged bottle was closed with a crown seal containing a rubber liner, and charged by needle through the liner with 427.0 grams of a 25 percent by weight solution of a 75/25 (w/w) blend of butadiene and styrene in hexane. A 0.5M hexane solution of a linear oligomeric oxolanyl ether was then charged by needle, such that 0.15 mole of ether per mole of Li was present, and then 2.59 ml of a 0.33M (heterogeneous) mixture of the p-Li phenyl aminal (III) was charged (about 0.8 meq Li per hundred grams of monomer). The bottle was agitated for 16 hours at 80° C., and then allowed to cool, and the contents were worked up as indicated in Example I. The product polymer was recovered in 54 percent yield and contained 15.4 percent styrene (0 percent block styrene), 28.4 percent vinyl (33.6 percent vinyl if butadiene=100 percent), Tg=–65° C. (DSC, onset), GPC (THF): $\overline{M}n$ 104471, Mw/Mn 2.31. The product polymer was compounded and tested as outlined in Example I.

The results of the physical tests were as follows:

| Example No. | ML/4/212 (cpd) | 1 Hz Dynastat tan δ 50° C. | 1 Hz Dynastat tan δ 23° C. | Ring Stress-Strain Room Temp. M300 | Ring Stress-Strain Room Temp. T.S. | Ring Stress-Strain Room Temp. % Eb |
|---|---|---|---|---|---|---|
| 3 | 76 | 0.1361 | 0.1549 | 1972[a] | 2952[a] | 459 |

[a]psi

The results of this test showed evidence for reduced hysteresis in this polymer, in that the Dynastat tan δ (50° C.)=0.1361 is about 30 percent below the value found for an unmodified polymer of this molecular weight, prepared using a typical alkyllithium initiator. Two other SBR polymers prepared in a similar manner using the lithium salt derived from the cyclic aminal of p-bromobenzaldehyde, and compounded and evaluated in the same way, exhibited tan δ (50° C.) which were 34 percent and 20 percent lower than the values expected for unmodified SBR polymers of their molecular weights.

EXAMPLE NO. 4 Preparation of Polymer from the Initiator of Structure IV

The cyclic aminal product from benzaldehyde and N,N'-diethylethylenediamine, when treated with about 1.0 equivalent of s-butyllithium and about 0.8–1 equivalent of TMEDA for 0.5–16 hours in cyclohexane, hexane, or mixtures thereof, gives a mixture of products, including Structures IVc, IVd, and IVe and some related products with higher levels of metalation. The predominant species are derived from Structure IVc.

This initiator is useful in the same manner as that of Example No. 1 to polymerize for example, butadiene, isoprene, styrene, and various mixtures thereof, to obtain rubbery polymers. These products will contain a functional group derived from the initiator that is attached to the end or backbone of the chain. When compounded with appropriate fillers and rubber chemicals as discussed above, the vulcanized compositions comprising these polymers will exhibit improved hysteresis properties when compared to polymers made without functionality.

In conclusion, it should be clear from the foregoing examples and specification disclosure that the initiators of the present invention are useful for the anionic polymerization of diene monomers to form homopolymers as well as copolymers with monovinyl aromatic monomers or trienes. The resulting elastomeric polymers have a functional group at the site of initiation and a lithium atom at the terminal, "living" end. After quenching, the polymers still retain the functional group at the site of initiation, which promotes uniform and homogeneous mixing with carbon black. As a result vulcanizable elastomeric compounds containing these polymers exhibit improved hysteresis which provides lower rolling resistance in tires and improved fuel economy. Additionally, the lithium terminated polymers can be quenched with compounds to provide terminal functional groups and hence, difunctional polymer chains.

It is to be understood that the invention is not limited to the specific reactants, initiators, or other compounds disclosed nor to any particular modifier or solvent. Similarly, the examples have been provided merely to demonstrate practice of the subject invention and do not constitute limitations of the invention. Those skilled in the art may readily select other monomers and process conditions, according to the disclosure made hereinabove.

Thus, it is believed that any of the variables disclosed herein can readily be determined and controlled without departing from the scope of the invention herein disclosed and described. Moreover, the scope of the invention shall include all modifications and variations that fall within the scope of the attached claims.

What is claimed is:

1. A functionalized polymer comprising:

a polymer chain selected from the group consisting of diene homopolymers and copolymers with monovinyl aromatic polymers, and carrying a functional group at one end of said chain and a lithium atom at the other end of said chain prior to quenching, and having the formula

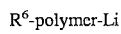

wherein $R^6$ is a functional group having a structure selected from the group consisting of

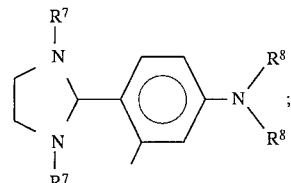

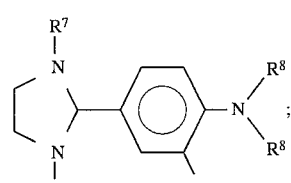

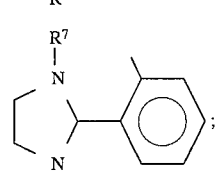

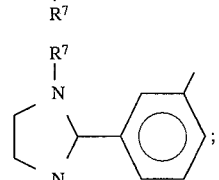

and,

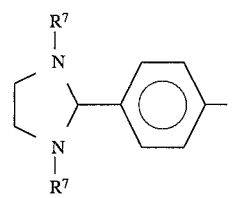

wherein each $R^7$ is the same or different and is an alkyl group having from 1 to about 8 carbon atoms, and wherein each $R^8$ is the same or different and is an alkyl group having from 1 to about 8 carbon atoms.

2. A functionalized polymer, as set forth in claim 1, wherein said elastomeric polymer is prepared from at least one monomer selected from the group consisting of diolefins having from about 4 to about 12 carbon atoms, monovinyl aromatic monomers having from 8 to about 20 carbon atoms, and trienes.

3. A functionalized polymer, as set forth in claim 2, wherein said polymer is a copolymer of monomers butadiene and styrene.

4. A functionalized polymer of the type formed by the polymerization of at least one anionically polymerizable monomer, and improved with respect to its hysteresis properties, the improvement comprising:

polymerizing at least one monomer selected from diolefin monomers having from about 4 to about 12 carbon atoms, monovinyl aromatic monomers having from about 8 to about 20 carbon atoms, and trienes in the presence of a polymerization initiator having a structure selected from the group consisting of

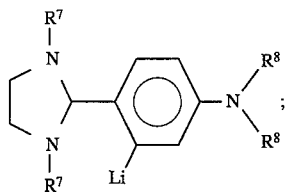

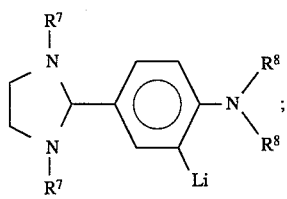

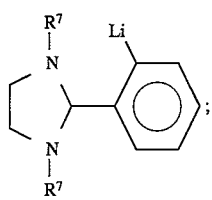

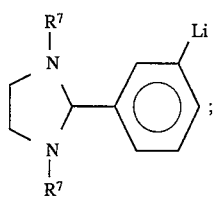

and,

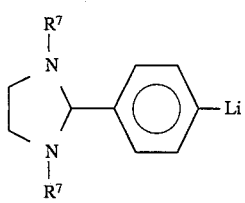

wherein each $R^7$ is the same or different and is an alkyl group having from 1 to about 8 carbon atoms, and wherein each $R^8$ is the same or different and is an alkyl group having from 1 to about 8 carbon atoms.

5. A functionalized polymer, as set forth in claim 4, wherein said polymer is a copolymer of butadiene and styrene.

* * * * *